No. 715,353. Patented Dec. 9, 1902.
T. DAVIS.
PROCESS OF MAKING DRESS SHIELDS.
(Application filed Apr. 9, 1902.)
(No Model.)
Fig. 1.
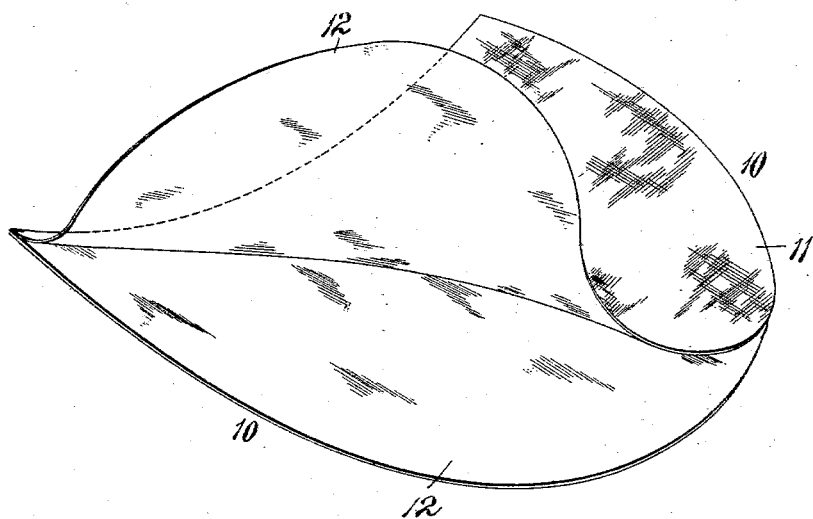
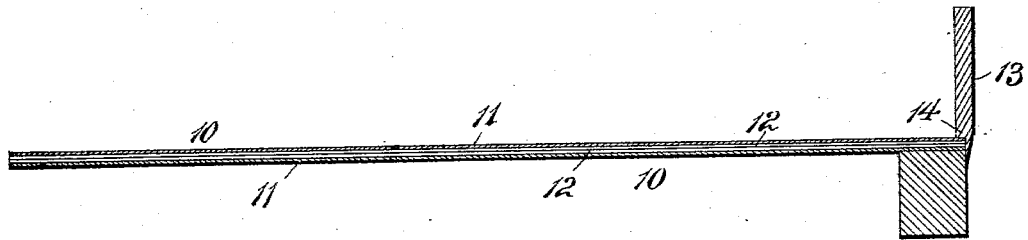
Fig. 2.
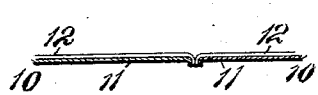
Fig. 3.
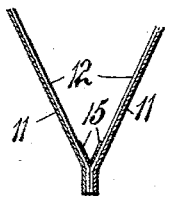
Fig. 4.
WITNESSES:
Wm H Caufield Jr
J. G. Dunbar
INVENTOR:
Theron Davis.
BY
W. B. Hutchinson,
ATTORNEY.
THE NORRIS PETERS CO., PHOTO-LITHO., WASHINGTON, D. C.

UNITED STATES PATENT OFFICE.

THERON DAVIS, OF NEW YORK, N. Y.

PROCESS OF MAKING DRESS-SHIELDS.

SPECIFICATION forming part of Letters Patent No. 715,353, dated December 9, 1902.

Application filed April 9, 1902. Serial No. 101,992. (No specimens.)

*To all whom it may concern:*

Be it known that I, THERON DAVIS, of the city, county, and State of New York, have invented certain new and useful Improvements in Processes of Making Dress-Shields and other Waterproof Articles, of which the following is a full, clear, and exact description.

My invention relates to improvements in the process of making dress-shields and analogous articles.

In the construction of dress-shields and other articles of similar structure where similar parts are united at a meeting edge it is desirable to make the meeting edges as smooth and strong as possible.

My invention has for its object to provide means for uniting the meeting parts of a dress-shield or similar thing in such a way that a perfect union will be made, that a better article than is usually manufactured will result, and that the ordinary processes will be cheapened.

To these ends my invention consists of a process which will hereinafter be fully described.

Reference is to be had to the accompanying drawings, forming part of this specification, in which similar figures and letters of reference refer to similar parts throughout the several views.

Figure 1 is a perspective view of a dress-shield, showing my improvements, the two parts of the shield being separated along one edge. Fig. 2 is a sectional view showing how when the parts of the shield are died out pressure can be applied to the edges which are to remain united. Fig. 3 is a detail sectional view of an open shield framed in accordance with my invention, and Fig. 4 is a broken detail sectional view illustrating a slightly-modified form of union for the meeting parts of the shield.

The material of the dress-shield 10 is a fabric covered with rubber. It is made of two parts, comprising each a backing 11 of fabric and a coating 12 of rubber. This inside rubber coating can be applied in any convenient way, as by calendering or dipping, and it is usually so thin as to be merely a film. I have found that by placing two such parts as described above together with the rubber faces meeting and then cutting through the said parts the pressure of the cutter will cause the rubber faces to stick together along the cutting-line, so that if the parts are then vulcanized the union will be quite smooth and very strong; but to get the best results it is advisable to press the two rubber faces firmly together along the edge which is to remain united, and in this way the two rubber faces become welded together and practically incorporated with each other, so that then if vulcanized the joint will be a perfect one. Care should be taken to have the pressure applied at the extreme edge of the parts to be united, so that the joint will be made as perfect as possible and will present a finished appearance. If the pressure is applied a little back of the extreme edge, the parts have a tendency to gap slightly, or at least swell out, and so present a rough appearance. This I believe to be a new feature in the art of making dress-shields and similar things.

If the shields are died out, a die is made to correspond to the shape of the shield and the two edges of the two parts which are to be united can be automatically pressed together by making the corresponding edge of the die (see Fig. 2) with a shoulder 14, so that as the die goes through the two parts or fabric of the shield it will press the parts beneath the shoulder very firmly together. This is probably the simplest way of effecting the pressure along the desired edge. The other edges, which are cut by the ordinary die edge, can be separated, as shown in Fig. 1, so that the meeting parts can then be vulcanized and made permanent.

The important point is to have the fabric as well as the rubber incorporated in the seam or joint, as this greatly strengthens the seam, prevents its stretching materially, and at the same time permits a smooth and cheap union of the parts to be effected.

I have found, too, that by using the ordinary die and having the bevel on the side next the two edges to be united I get sufficient pressure along said edge or edges in the act of dieing to cause the meeting parts to firmly adhere to each other, so that when vulcanized a perfect union results.

My invention is not limited to the use of the die as specified, and the two parts of the shield can be cut out in any other way, placed face to face, as already described, and the edge which is to be made permanent subjected to pressure and then vulcanized.

To make the meeting parts still stronger, a reinforcing-band 15, either of rubber or fabric, can be cemented in along the joint, as shown in Fig. 4.

I have described, and in the claims shall refer to, a process of making dress-shields; but it is apparent that the process is equally applicable to analogous articles, and the claims should therefore be constructed to cover other articles.

Having thus fully described my invention, what I claim as new, and desire to secure by Letters Patent, is—

1. The herein-described process of making dress-shields which consists in shaping the parts of rubber-coated fabrics, placing them with the rubber faces together so that both the rubber and fabric shall be included in the parts which make the joint, then subjecting the parts to be united to pressure, the pressure being applied at the extreme edge of the joint or seam, and finally vulcanizing the whole.

2. The herein-described process of uniting the parts of a dress-shield which consists in forming the joint or junction between the parts of rubber and fabric with the rubber portions in contact, subjecting the rubber and fabric to pressure along the extreme edge of the united parts and then vulcanizing the whole.

3. The herein-described process of making dress-shields, which consists in shaping the essentially half portions of the shield from a rubber-coated fabric, placing together two edges of the two half portions which are to be united, overlapping the seam with a reinforcing-strip, subjecting to pressure the edges to be united, and then vulcanizing the whole shield.

4. The herein-described process of uniting the edges of rubber-coated dress-shields, which consists in placing the rubber surfaces face to face, placing together the two edges of the two portions which are to be united, overlapping the seam between the rubber faces with a reinforcing-strip, securing the parts together at the seam and then vulcanizing the whole shield.

In testimony whereof I have signed my name to this specification in the presence of two subscribing witnesses.

THERON DAVIS.

Witnesses:
W. B. HUTCHINSON,
J. G. DUNBAR.